United States Patent [19]

Lagana' et al.

[11] 4,376,717

[45] Mar. 15, 1983

[54] PROCESS FOR THE PREPARATION OF GASES WHICH CONTAIN HYDROGEN AND NITROGEN

[75] Inventors: Vincenzo Lagana', Milan; Francesco Saviano, Segrate; Piero Bisi, Paderno Dugnano, all of Italy

[73] Assignee: Snamprogetti, S.p.A., Milan, Italy

[21] Appl. No.: 215,167

[22] Filed: Dec. 11, 1980

[30] Foreign Application Priority Data

Aug. 29, 1980 [IT] Italy .............................. 24358 A/80

[51] Int. Cl.$^3$ ................................................ C01B 2/30
[52] U.S. Cl. .................................................... 252/376
[58] Field of Search ................................. 252/376, 373

[56] References Cited

U.S. PATENT DOCUMENTS 1,874,801 8/1932 Porter ................................... 252/376
3,186,797 6/1965 Pearce et al. ........................ 252/376
3,441,393 4/1969 Finneran et al. .................... 252/376

*Primary Examiner*—Alan Siegel

*Attorney, Agent, or Firm*—Morgan, Finnegan, Pine, Foley & Lee

[57] ABSTRACT

An improved process is disclosed for preparing gases containing hydrogen and nitrogen and which is especially suitable for the synthesis of ammonia. Using natural gas or virgin naphtha as the starting materials, the reforming reaction with steam takes place in two serially arranged stages, the first of which occurs at an inlet temperature of from 400° C. to 650° C. and an exit temperature of from 650° C. to 750° C., a conversion of from 20% to 50% being effected, the second stage working at an exit temperature of from 750° C. to 850° C. and the conversion being increased up to 70%. Air reforming is carried out under conditions at which the exit temperature of the gas is between 920° C. and 1050° C. and the sensible heat of the effluent gases from the air reforming at such temperature condition is employed to activate the second steam reforming stage. Tube bundle heat-exchangers, the tubes of which are filled with an appropriate catalyst, are used.

5 Claims, No Drawings

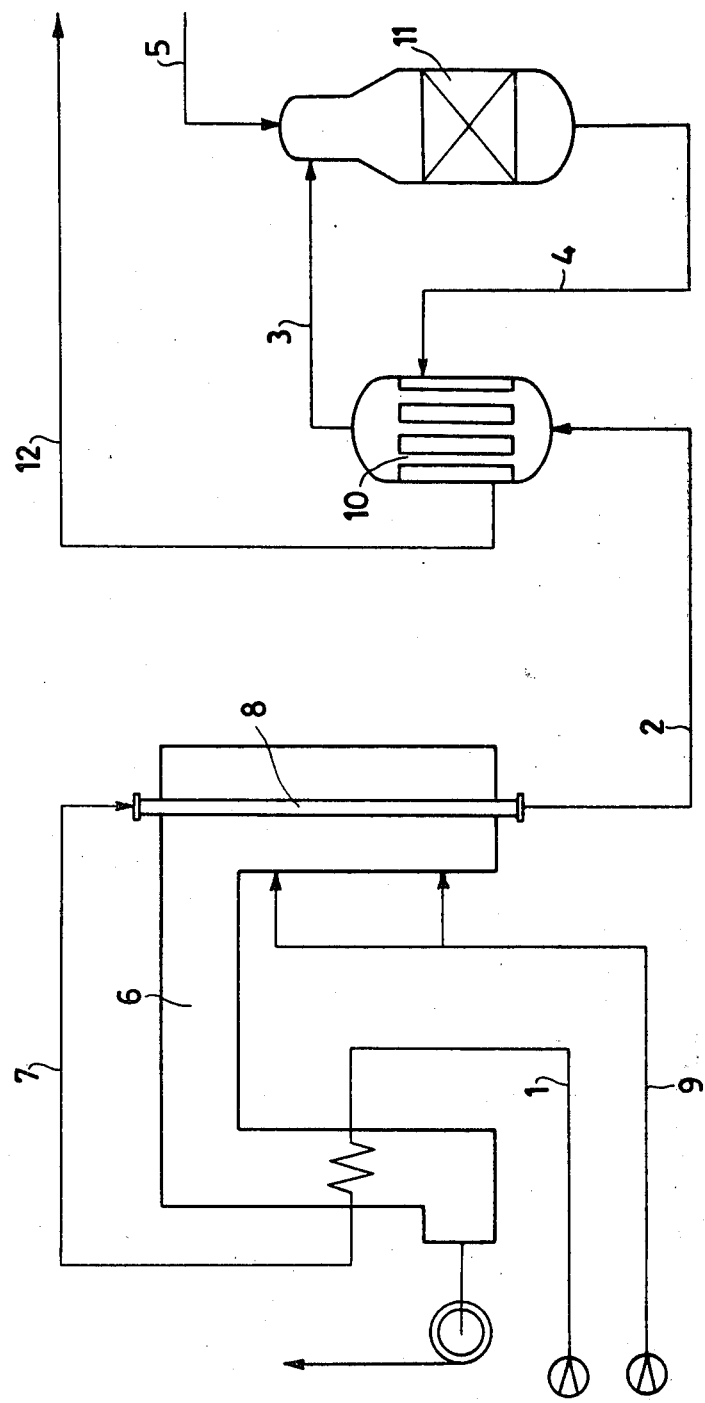

PROCESS FOR THE PREPARATION OF GASES WHICH CONTAIN HYDROGEN AND NITROGEN

This invention relates to a process for the preparation of gases which contain hydrogen and nitrogen. More particularly, this invention relates to a process for producing a gas suitable for use in the synthesis of ammonia.

For the preparation of gases which contain hydrogen and nitrogen when starting from natural gas or "virgin naphtha", resort is had, according to the conventional art, to steam reforming processes which consist in treating such natural gas or virgin naphtha with steam in a tubular catalytic zone placed in an oven (primary reforming) and then subsequently treating the charge exiting the primary reforming in a zone of partial combustion (secondary reforming) which is likewise provided with an appropriate catalyst.

In most recent times, modifications have been suggested in the steam reforming procedure. Of particular interest are those disclosed in the U.S. Pat. Nos. 4,162,290 and 4,127,389.

The former patent discloses a process for the production of a gas containing hydrogen and nitrogen which comprises a step in which a portion of the natural gas in a tubular catalytic zone is placed in an oven, the remaining portion being caused to flow through a bundle of tubes filled with a reforming catalyst in a heat exchanger heated by the hot gases exiting the secondary reforming.

The two streams coming from the respective zones (oven and tubes of the heat-exchanger) are then combined and sent to the secondary reforming stage together with air.

U.S. Pat. No. 4,127,389 discloses the heat-exchanging apparatus with the tubes of the tube bundle filled with primary reforming catalyst, as used in the process described in the U.S. Pat. No. 4,162,290 aforementioned.

In the U.S. Pat. No. 4,127,389 it is stated that the heat-exchanging apparatus can be exploited for carrying out the primary reforming by using the heat of the gases coming from the secondary reforming as a heating source.

Thus, from the published technical literature it is known the a heat-exchanger with the tubes of its tube bundle filled with a catalyst can be used for carrying out the primary reforming by exploiting the heat of the gases coming from the secondary reforming.

At this stage, however, it is imperative to point out that, when the heat-exchanger-reactor is to be used in lieu of the conventional reforming oven, the temperature of the secondary reforming stage must considerably be increased, and this can be done only by burning a greater volume of gas with a greater volume of air, so that, eventually, a nitrogen:hydrogen ratio will be found, which is much above the one required for one of the principal purposes for which the reforming gas is currently prepared, that is to say, for producing a gas adapted to the synthesis of ammonia.

On the other hand, it is just this the reason that is U.S. Pat. No. 4,162,290 the reforming step is carried out in parallel in the heat-exchanger-reactor and in the conventional oven as well.

The apportioning of the charge in accordance with the process disclosed in the U.S. Pat. No. 4,162,290 partly to the exchanger-reactor and partly to the conventional oven results in considerable complexity in the process since it introduces a supplementary apparatus along with complications in the regulation for appointing the hydrocarbon stream, but without substantially alleviating the working conditions of the conventional oven.

The complications of the process described in the U.S. Pat. No. 4,162,290 are a bar to its practical exploitation.

It has now been found that the complications enumerated above and the shortcomings of the prior art, which are responsible for a considerably higher cost of the reforming, can all be offset by arranging the exchanger-reactor in serial relationship relative to the oven and by carrying out appropriate conversions of the hydrocarbonaceous charge in the oven, in the heat-exchanger and in the secondary reforming as well.

The process according to the present invention is accomplished by feeding the natural gas or the virgin naphtha at a high temperature to a steam reforming procedure consisting of two serially arranged stages, which carry out partial conversions of the natural gas or virgin naphtha, as set forth in more detail hereinafter, and subsequently the reactants from the second steam reforming stage to an air reforming stage (secondary reforming) which works at such a temperature that the heat of the gases exiting the latter stage serves to operate the second steam reforming stage. Steam may also be apportioned between the two serially arranged steam reforming stages, even though, as a rule, it is entirely introduced in the first stage.

The process according to the present invention is comprised of the following stages:

(a) Feeding the tubes filled with a reforming catalyst, placed in the radiating section of an oven, with steam and the natural gas, or virgin naphtha, the molar ratio steam to carbon being from 2 to 5, and by therefor optionally heating them previously at a temperature of from 400° C. to 650° C.;

(b) Causing a conversion to occur of from 20% to 50% of the natural gas or virgin naphtha fed into the tubes, the exit temperature being from 650° C. to 750° C.;

(c) Discharging the partially converted gases from the tubes of the radiating section of the oven;

(d) Introducing the gases discharged from (c) hereinabove into the tubes of an exchanger-reactor filled with catalyst wherein the conversion is brought to 70% while adjusting the exiting temperature between 750° C. and 850° C.;

(e) Discharging the gases from the exchanger-reactor and introducing them into the secondary reforming reactor at the exit of which the temperature is maintained between 920° C. and 1050° C. by burning air;

(f) Discharging the gases of the secondary reforming reactor and causing them to flow through the side of the casing of the exchanger-reactor in such a way as to attain the same temperature as in (d) above, and (g) Discharging from the casing of the exchanger-reactor the reformed gas.

It is to be noted that by operating in accordance with the present invention, the working pressure can considerably be increased as compared with known conventional processes. None particularly, the process according to the present invention is carried out under pressures of from 50 to 80 atm, and preferably from 60 atm to 70 atm.

The process according to the present invention will now be illustrated without limitation by the diagram of the accompanying drawing.

Natural gas and the steam are fed via the line 1 to an oven where they are preheated in the convective section of the oven 6 and introduced via the line 7 into the tubes 8 (only one is shown) which are filled with a reforming catalyst.

The inlet temperature, in the tubes, of the gas and steam mixture is 520° C., whereas the exiting temperature is 730° C.

The fuel gas is fed to the oven via the line 9.

The gas exiting 8, reformed to an extent of 44%, is sent via the line 2 to the exchanger-reactor 10, wherein it flows through the catalyst-filled tubes. The exchanger-reactor 10 is fed through the casing side with the hot gases coming from the secondary apparatus 11 via the line 4 these gases having a temperature of 974° C.

The gases exiting the tubes of the exchanger-reactor have a temperature of 824° C. and, via the line 3, feed the secondary reforming apparatus 11 to which air is supplied via the line 5 at a temperature of 550° C.

The reformed gas is discharged through the casing of the exchanger-reactor via the line 12 at a temperature of 758° C.

A balance sheet of the materials is set forth below for the reactants, temperature and products mentioned above.

|  | N° of stream | | | | | | | |
|---|---|---|---|---|---|---|---|---|
|  | 1 | | 2 | | 3 | | 4 | |
| Components | $Nm^3/h$ | % on dry matt | $Nm^3/h$ | % on dry matt | $Nm^3/h$ | % on dry matt. | $Nm^3/h$ | % on dry matter |
| $CH_4$ | 23803 | 76.09 | 15517 | 20.04 | 9514 | 9.86 | 799 | 0.58 |
| $C_2H_6$ | 1173 | 3.75 | | | | | | |
| $C_3H_8$ | 337 | 1.08 | | | | | | |
| $C_4H_{10}$ | 143 | 0.46 | | | | | | |
| $C_5H_{12}$ | 47 | 0.15 | | | | | | |
| $H_2$ | 1457 | 4.66 | 45125 | 58.29 | 64189 | 66.53 | 75759 | 55.05 |
| CO | | | 3678 | 4.75 | 8624 | 8.94 | 16207 | 11.78 |
| $CO_2$ | 3519 | 11.25 | 12294 | 15.88 | 13350 | 13.84 | 14483 | 10.52 |
| $N_2$ | 796 | 2.54 | 796 | 1.03 | 796 | 0.82 | 30005 | 21.81 |
| A | 6 | 0.02 | 6 | 0.01 | 6 | 0.01 | 352 | 0.26 |
| $H_2O$ | 132254 | | 111025 | | 103966 | | 109825 | |
| Total Dry | 31281 | $Nm^3/h$ | 77416 | $Nm^3/h$ | 96479 | $Nm^3/h$ | 137605 | $Nm^3/h$ |
| Grand Total | 163535 | $Nm^3/h$ | 188441 | $Nm^3/h$ | 200445 | $Nm^3/h$ | 247430 | $Nm^3/h$ |

It is to be noted also that operating in accordance with the teachings of the present invention, a reforming oven is used which is of reduced size and improved reliability since the operating conditions are less drastic.

In addition, it is to be noted that the consumption of radiant heat to be administered to the reforming oven is reduced by approximately 35% and, moreover, there is also to be taken into account the savings in compression power which are made possible by the fact that the process according to this invention provides a synthesis gas at a pressure which is considerably higher than that of the conventional methods.

We claim:

1. A process for the preparation of gases which contain hydrogen and nitrogen starting from natural gas or virgin naphtha by steam reforming in two stages and subsequent air reforming in one stage, comprising feeding said natural gas or virgin naphtha to the first steam reforming stage at a temperature of from 400° C. to 650° C. and converting from 20% to 50% thereof in said first steam reforming stage, removing the partially converted natural gas or virgin naphtha from said first steam reforming stage at a temperature between 650° C. and 750° C. and feeding the same to the second steam reforming stage, raising the conversion of said partially converted natural gas or virgin naphtha up to 70% in said second steam reforming stage, removing the partially converted natural gas or virgin naptha from said second steam reforming stage at a temperature between 750° C. and 850° C. and feeding the same to the air reforming stage, further converting the partially converted natural gas or virgin naphtha with burning air in said air reforming stage, raising and maintaining the temperature thereof to a temperature between 920° C. and 1050° C. in said air reforming stage, producing a gas having a temperature which is sufficient to actuate the second stage of said steam reforming and employing the sensible heat of the effluent gases from the air reforming to actuate the second stage of steam reforming.

2. Process according to claim 1, wherein the first stage of steam reforming is carried out in tubes filled with a catalyst and disposed in the interior of the radiating section of an oven.

3. Process according to claim 1, wherein the second steam reforming stage is carried out in tubes of a tube bundle exchanger which are filled with catalyst, said tube bundle exchanger being heated by the sensible heat of the effluent gases of the air reforming stage flowing through the side of the casing of said tube bundle exchanger.

4. A process for the preparation of gases which contain hydrogen and nitrogen starting from natural gas or virgin naphtha comprising the steps of:
   (a) feeding said natural gas or virgin naphtha and steam, in a molar ratio of steam to carbon of from 2 to 5, into contact with a reforming catalyst at a temperature of from 400° C. to 650° C. to a first steam reforming stage and converting from 20% to 50% of said natural gas or virgin naphtha feed to gases containing hydrogen and nitrogen in said steam reforming stage while raising the exit temperature of said gases flowing from said stage to a temperature between 650° C. and 750° C.,
   (b) feeding the partially converted gases into contact with a reforming catalyst in a second steam reforming stage and increasing the conversion thereof to 70% while raising the exit temperature of said gases flowing from said second steam reforming stage to a temperature between 750° C. and 850° C.,
   (c) feeding the partially converted gases from said second steam reforming stage to an air reforming stage and further converting said gases with burning air while raising and maintaining the temperature of said gases flowing from said air reforming stage to a temperature between 920° C. and 1050° C., (d) feeding the further converted gases from said air reforming stage back to said second steam reforming stage and utilizing the sensible heat of said gases to maintain the temperature of said second steam reforming stage to a temperature between 750° C. to 850° C. and receiving said gases as reformed gas, (e) said process being carried out at pressures of from 50 to 80 atmospheres.

5. Process according to claim 4 wherein the pressures are from 60 to 70 atmospheres.

* * * * *